US012775112B2

(12) United States Patent
Song et al.

(10) Patent No.: US 12,775,112 B2
(45) Date of Patent: Oct. 27, 2026

(54) METHOD AND APPARATUS FOR CALIBRATING PHOTOELECTRIC CONVERSION MODULE, COMPUTER DEVICE, AND STORAGE MEDIUM

(71) Applicant: Shanghai United Imaging Healthcare Co., Ltd., Shanghai (CN)

(72) Inventors: Guofeng Song, Shanghai (CN); Zhenjie Han, Shanghai (CN)

(73) Assignee: Shanghai United Imaging Healthcare Co., Ltd., Shanghai (CN)

( * ) Notice: Subject to any disclaimer, the term of this patent is extended or adjusted under 35 U.S.C. 154(b) by 114 days.

(21) Appl. No.: 18/981,753

(22) Filed: Dec. 16, 2024

(65) Prior Publication Data

US 2025/0199190 A1 Jun. 19, 2025

(30) Foreign Application Priority Data

Dec. 16, 2023 (CN) ......................... 202311739385.9

(51) Int. Cl.
*G01T 7/00* (2006.01)
*G01T 1/20* (2006.01)

(52) U.S. Cl.
CPC ............ *G01T 7/005* (2013.01); *G01T 1/2018* (2013.01)

(58) Field of Classification Search
CPC .............................. G01T 7/005; G01T 1/2018
See application file for complete search history.

(56) References Cited

U.S. PATENT DOCUMENTS 6,559,450 B1 * 5/2003 Berlad .................. G01T 1/1647 250/363.09
2017/0343684 A1 * 11/2017 Iwatschenko-Borho .................... G01T 1/40

FOREIGN PATENT DOCUMENTS

CN 101292174 A 10/2008
CN 104614757 B 7/2017

* cited by examiner

*Primary Examiner* — Hugh Maupin

(57) ABSTRACT

A method for calibrating a photoelectric conversion module of a gamma detector is provided, where the gamma detector includes a scintillation crystal and a plurality of photomultiplier tubes. The method includes acquiring a plurality of sets of background data, each including photoelectric signals generated by the photomultiplier tubes based on an interaction of the scintillation crystal with a cosmic ray, determining interaction positions based on the background data, where the scintillation crystal interacts with cosmic rays respectively, determining target regions of the photomultiplier tubes based on positions of the photomultiplier tubes, respectively, obtaining an energy spectrum of each of the photomultiplier tubes based on the background data corresponding to the interaction positions that fall within the target region of each of the photomultiplier tubes, and calibrating a relative gain of each of the photomultiplier tubes based on the corresponding energy spectrum.

20 Claims, 7 Drawing Sheets

METHOD AND APPARATUS FOR CALIBRATING PHOTOELECTRIC CONVERSION MODULE, COMPUTER DEVICE, AND STORAGE MEDIUM

CROSS-REFERENCE TO RELATED APPLICATIONS

The present disclosure claims priority to Chinese patent application No. 202311739385.9, titled “METHOD AND APPARATUS FOR CALIBRATING PHOTOELECTRIC CONVERSION MODULE, COMPUTER DEVICE, AND STORAGE MEDIUM”, filed on Dec. 16, 2023, the entire content of which is incorporated herein by reference.

TECHNICAL FIELD

The present disclosure relates to the technical field of photomultiplier tube calibration, particularly to a method and apparatus for calibrating a photoelectric conversion module, a computer device, and a storage medium.

BACKGROUND

A gamma detector typically consists of a scintillating crystal, a photoelectric conversion module, and a readout electronics module. When a gamma photon interacts with the scintillating crystal, it produces visible light. This visible light is collected by the photoelectric conversion module coupled to the scintillating crystal, and converted into an electrical signal. The charge amount of the electrical signal is proportional to the number of photons collected. The electrical signal is processed and recorded by the readout electronics module, which performs certain algorithmic processing on the signals to obtain information such as the time and position of the interaction between the gamma photon and the crystal, as well as the energy of the gamma photon.

The photoelectric conversion module typically consists of multiple photomultiplier tubes, but the gain of different photomultiplier tubes usually varies, which can affect the performance of the gamma detector. Therefore, it is necessary to calibrate the relative gain of the photomultiplier tubes. This calibration can be done by adjusting the hardware or algorithmic methods to eliminate the impact of the gain nonuniformity of the photomultiplier tubes.

SUMMARY

One aspect of the present disclosure provides a method for calibrating a photoelectric conversion module of a gamma detector. The gamma detector includes a scintillation crystal and a plurality of photomultiplier tubes. The method includes: acquiring a plurality of sets of background data, each set of the background data including photoelectric signals generated by the plurality of photomultiplier tubes based on an interaction of the scintillation crystal with a cosmic ray; determining interaction positions based on the plurality of sets of background data, respectively, the interaction positionings being positions where the scintillation crystal interacts with cosmic rays respectively; determining target regions of the photomultiplier tubes based on positions of the photomultiplier tubes, respectively; obtaining an energy spectrum of each of the photomultiplier tubes based on the background data corresponding to the interaction positions that fall within the target region of each of the photomultiplier tubes; and calibrating a relative gain of each of the photomultiplier tubes based on the corresponding energy spectrum.

In some embodiments, determining the interaction positions based on the plurality of sets of background data, respectively, includes calculating an energy center of gravity of all the photoelectric signals of each set of background data by a center of gravity method and taking the energy center of gravity as the interaction position.

In some embodiments, calculating the energy center of gravity of all the photoelectric signals of each set of background data by the center of gravity method includes: obtaining horizontal coordinates and vertical coordinates of centers of the plurality of photomultiplier tubes; calculating a weighted average of the horizontal coordinates of the centers with energy values of the corresponding photoelectric signals as weights, as a horizontal coordinate of the energy center of gravity; calculating a weighted average of the vertical coordinates of the centers with the energy values of the corresponding photoelectric signals as weights, as a vertical coordinate of the energy center of gravity; and determining the energy center of gravity based on the horizontal coordinate and the vertical coordinate of the energy center of gravity.

In some embodiments, calculating the energy center of gravity of all the photoelectric signals of each set of background data by the center of gravity method includes: selecting photomultiplier tubes with the corresponding photoelectric signals greater than a threshold value; obtaining horizontal coordinates and vertical coordinates of centers of the selected photomultiplier tubes; calculating a weighted average of the horizontal coordinates of the centers with energy values of the corresponding photoelectric signals as weights, as a horizontal coordinate of the energy center of gravity; calculating a weighted average of the vertical coordinates of the centers with the energy values of the corresponding photoelectric signals as weights, as a vertical coordinate of the energy center of gravity; and determining the energy center of gravity based on the horizontal coordinate and the vertical coordinate of the energy center of gravity.

In some embodiments, determining the target regions of the photomultiplier tubes based on the positions of the photomultiplier tubes, respectively, includes determining a region within a distance of less than a preset value from a center of each of the photomultiplier tubes as the target region of the corresponding photomultiplier tube.

In some embodiments, calibrating the relative gain of each of the photomultiplier tubes based on the corresponding energy spectrum includes: calculating relative energies of the photomultiplier tubes based on the energy spectrums, respectively; calculating an average of all the relative energies as an energy mean value; and taking a ratio of one of the relative energies to the energy mean value as the relative gain of the corresponding photomultiplier tube.

In some embodiments, calculating the relative energies of the photomultiplier tubes based on the energy spectrums, respectively, includes selecting a mode of energy values in the energy spectrum as the relative energy of the corresponding photomultiplier tube.

In some embodiments, calculating the relative energies of the photomultiplier tubes based on the energy spectrums, respectively, includes calculating an average of all energy values in the energy spectrum as the relative energy of the corresponding photomultiplier tube.

In some embodiments, the method further includes correcting an energy value of a photoelectric signal generated by the photomultiplier tube during a medical imaging process based on the corresponding relative gain, and obtaining a corrected energy value.

Another aspect of the present disclosure provides an apparatus for calibrating a photoelectric conversion module of a gamma detector. The gamma detector including a scintillation crystal and a plurality of photomultiplier tubes, the apparatus including: a data acquisition module, configured to acquire a plurality of sets of background data, each set of the background data including photoelectric signals generated by the plurality of photomultiplier tubes based on an interaction of the scintillation crystal with a cosmic ray; a position determination module, configured to determine interaction positions based on the plurality of sets of background data, respectively, the interaction positionings being positions where the scintillation crystal interacts with cosmic rays respectively; a region determination module, configured to determine target regions of the photomultiplier tubes based on positions of the photomultiplier tubes, respectively; an energy spectrum generation module, configured to obtain an energy spectrum of each of the photomultiplier tubes based on the background data corresponding to the interaction positions that fall within the target region of each of the photomultiplier tubes; and a gain calibration module, configured to calibrate a relative gain of each of the photomultiplier tubes based on the corresponding energy spectrum.

Yet another aspect of the present disclosure provides a computer device, including a memory and a processor. The memory stores a computer program. The processor, when executing the computer program, performs a method for calibrating a photoelectric conversion module of a gamma detector according to any one of the above-described embodiments.

Yet another aspect of the present disclosure provides a non-transitory computer-readable storage medium storing a computer program. The computer program, when executed by a processor, causes the processor to perform a method for calibrating a photoelectric conversion module of a gamma detector according to any one of the above-described embodiments.

DETAILED DESCRIPTION

In order to make the objectives, technical solutions, and advantages of the present disclosure clearer, the following detailed description of the application is provided in conjunction with the accompanying drawings and embodiments. It should be understood that the specific embodiments described here are intended to explain the application and are not meant to limit it.

In the related art, a gamma ray source is used to irradiate the scintillating crystal corresponding to each photomultiplier tube, and the amplitude spectrum of the output signal from each photomultiplier tube is analyzed and feature extraction is performed. Then, based on the features of the output signal, the relative gain of each photomultiplier tube is calibrated. However, this method requires the use of an additional radioactive source and involves more complicated operations.

Figure 1:
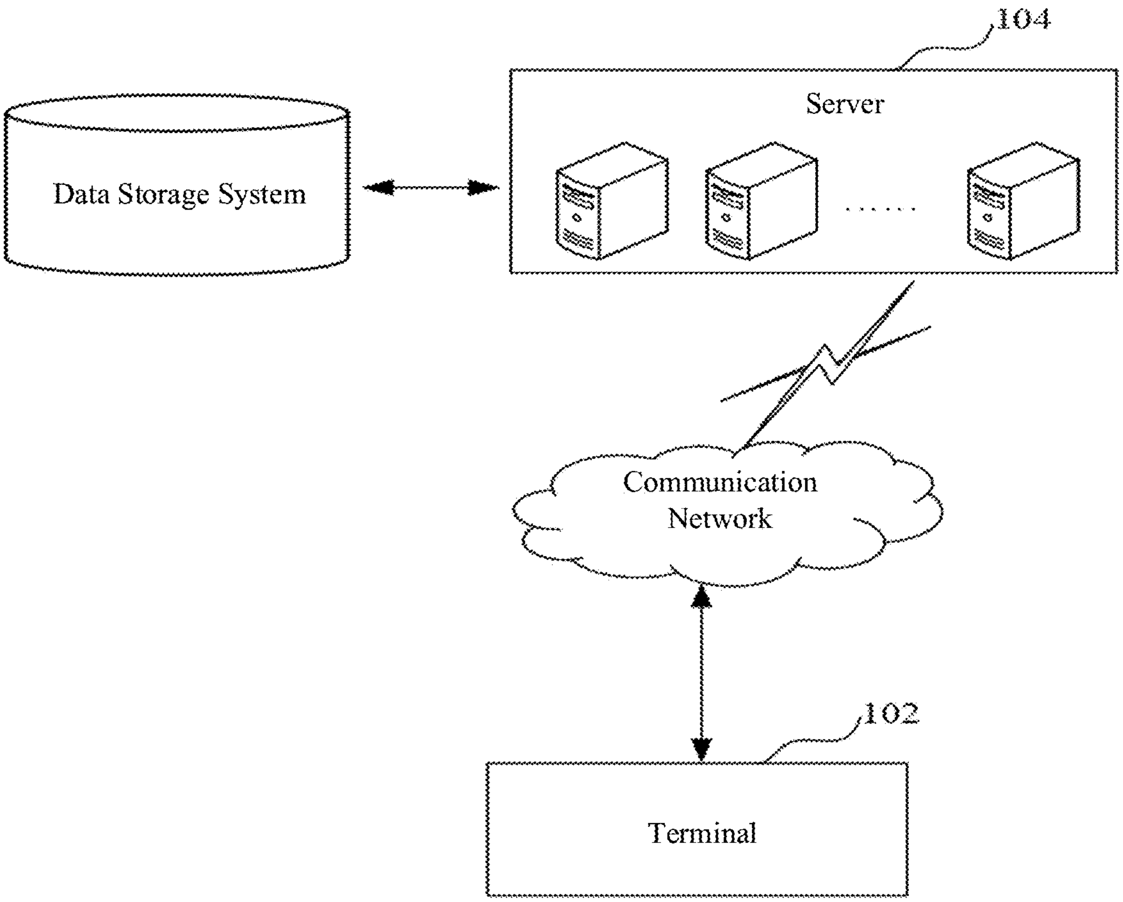
FIG. 1 is a diagram illustrating an application environment of a method for calibrating a photoelectric conversion module according to some embodiments of the present disclosure.

The method for calibrating a photoelectric conversion module provided in embodiments of the present disclosure can be applied to the application environment shown in FIG. 1. In this environment, a terminal 102 communicates with a server 104 through a communication network. A data storage system can store data that the server 104 needs to process. The data storage system may be integrated into the server 104, or hosted on the cloud or other network servers. The data storage system contains background data obtained from collection, and the terminal 102 can realize the calibration of a photoelectric conversion module by acquiring a plurality of sets of background data and performing corresponding data processing. The terminal 102 can be, but is not limited to, various personal computers, laptops, tablet computers, etc. The server 104 can be implemented using an independent server or a server cluster consisting of multiple servers.

The method for calibrating a photoelectric conversion module provided in the embodiments of the present disclosure is applied for the calibration of the photoelectric conversion module in a gamma detector. The gamma detector includes a scintillating crystal and a plurality of photomultiplier tubes (PMT). The gamma detector includes but not limited to a silicon photomultiplier (SiPM), a microchannel plate (MCP), etc., each of which includes a plurality of photomultiplier tubes that form a photoelectric conversion module. The scintillating crystal covers all of the photomultiplier tubes. By arranging the photomultiplier tubes in a specific pattern, gamma rays over a large area can be detected. During the detection, the scintillating crystal generates photons when receiving gamma rays, and the photons are collected by the photomultiplier tubes and converted into an electrical signal. The amount of charge in the electrical signal is proportional to the number of photons collected.

The gamma detector can also be, for example, a pixel-type gamma detector which is composed of multiple independent detection units. These independent detection units are arranged in an array, with each unit capable of independently detecting the interactions of gamma photons and providing detailed information about the interaction events, such as time, position, energy, and so on.

Figure 2:
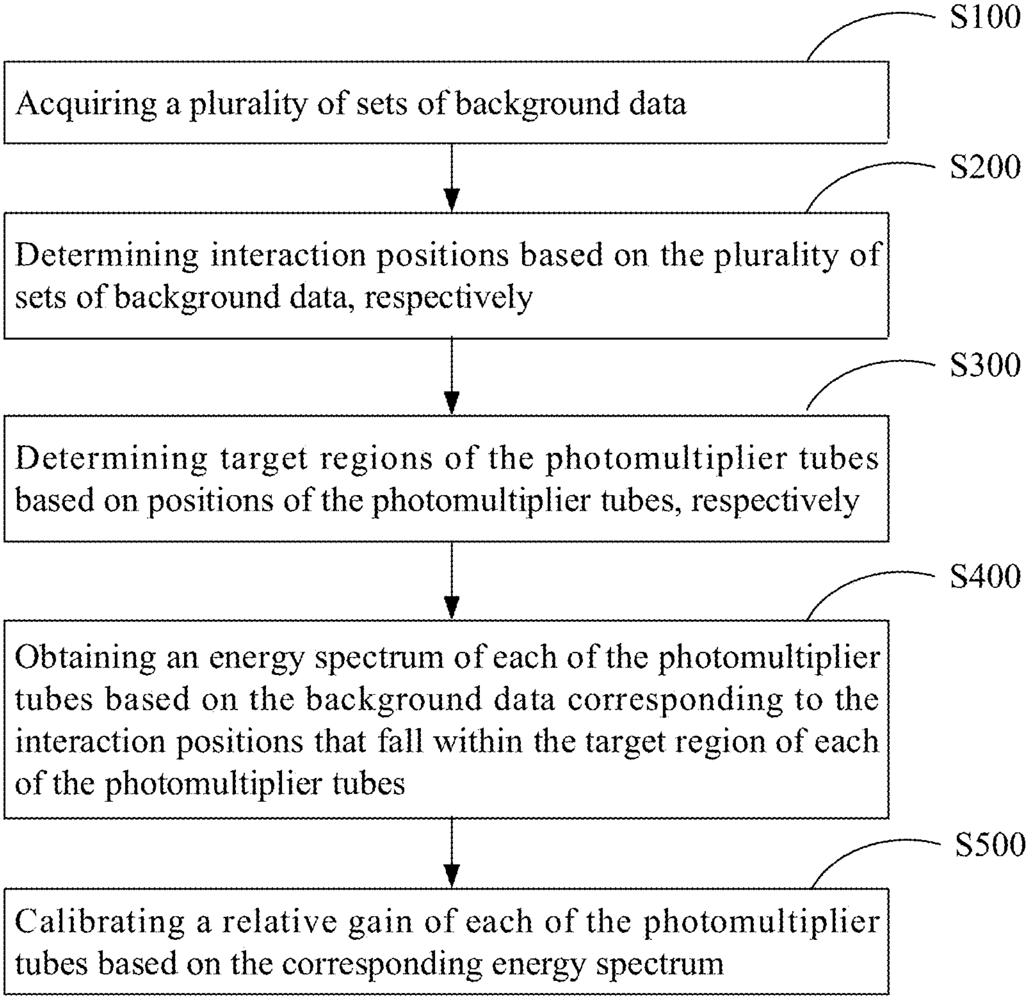
FIG. 2 is a schematic flowchart of a method for calibrating a photoelectric conversion module according to some embodiments of the present disclosure.

In some embodiments, as shown in FIG. 2, a method for calibrating a photoelectric conversion module is provided. The method, applied to the terminal 102 in FIG. 1 as an example, includes the following steps S100-S500.

In step S100, a plurality of sets of background data are acquired.

Specifically, the terminal 102 can obtain a plurality of sets of background data from the server 104. Each set of background data includes photoelectric signals generated by all the photomultiplier tubes based on the interaction between the scintillating crystal and a cosmic ray. The magnitude of the photoelectric signal depends on the energy and quantity of the photons received. It can be understood that after a single interaction between the scintillating crystal and the cosmic ray, the photoelectric signals generated by all the photomultiplier tubes can be considered as a single set of background data. A plurality of sets of background data represent the collection of photoelectric signals generated by the photomultiplier tubes from multiple interactions between the scintillating crystal and cosmic rays over a period of time. The collected photoelectric signals can be grouped based on the signal generation time, thus obtaining a plurality of sets of background data. For example, tens of thousands to hundreds of thousands of sets of background data can be collected over a period of time. Additionally, no radiation source needs to be provided during the background data collection. Instead, the natural cosmic rays present in space are used to generate photons, which are then detected to produce corresponding photoelectric signals.

In step S200, interaction positions are determined based on the plurality of sets of background data, respectively.

In some embodiments, the interaction position refers to positions where the scintillating crystal interacts with the cosmic rays respectively. The cosmic rays strike and interact with the scintillating crystal, causing the atoms or molecules in the scintillating crystal to be excited and then de-excited, releasing photons. The number of photons released depends on the energy of the cosmic rays and the properties of the scintillating crystal. Since the initial direction of the emitted photons varies, photons emitted from a single interaction may be detected by the photomultiplier tubes at different positions. The photomultiplier tubes closer to the interaction position can receive more photons. Therefore, by analyzing the energy information of the photoelectric signals detected by all the photomultiplier tubes in one set of background data, as well as the positional information of the photomultiplier tubes, the position of the interaction can be calculated. It can be understood that in the embodiments, the interaction position may refer only to a position on a two-dimensional plane, without needing to calculate a depth of the cosmic ray interaction within the scintillating crystal.

In step S300, target regions of the photomultiplier tubes are determined based on positions of the photomultiplier tubes, respectively.

Specifically, all positions on the scintillating crystal can interact with the cosmic rays, but in a gap between two photomultiplier tubes, most photons generated from the interaction will not be detected by the photomultiplier tubes. To reduce the impact of this portion of interaction data on gain calibration and simultaneously reduce the amount of data during computation, this portion of data can be filtered out. Therefore, a target region is determined based on the position of the photomultiplier tube to filter the plurality of sets of background data. For example, the target region can be located at the center, edge, or other positions of the photomultiplier tube. For example, the target region may be a circular one or a rectangular one within an entire detection range of the photomultiplier tube. In some embodiments, each photomultiplier tube has its own target region, and the target regions of the photomultiplier tubes have the same position with respect to the corresponding photomultiplier tube and have the same size.

In step S400, an energy spectrum of each of the photomultiplier tubes is obtained based on the background data corresponding to the interaction positions that fall within the target region of each of the photomultiplier tubes.

The background data corresponding to the interaction positions that fall within the target region of each of the photomultiplier tubes is also referred to as detection data. Specifically, after determining the target region, the acquired plurality of sets of background data are filtered, and the background data corresponding to the interaction positions that fall within the target region of each of the photomultiplier tubes is taken as detection data for the corresponding photomultiplier tube. It can be understood that the target region is a region on a two-dimensional plane, and therefore, the interaction positions can be compared with the target region. In addition, each photomultiplier tube includes corresponding detection data, and the detection data contains the photoelectric signals generated by the photomultiplier tube from the plurality of sets of background data.

Figure 5:
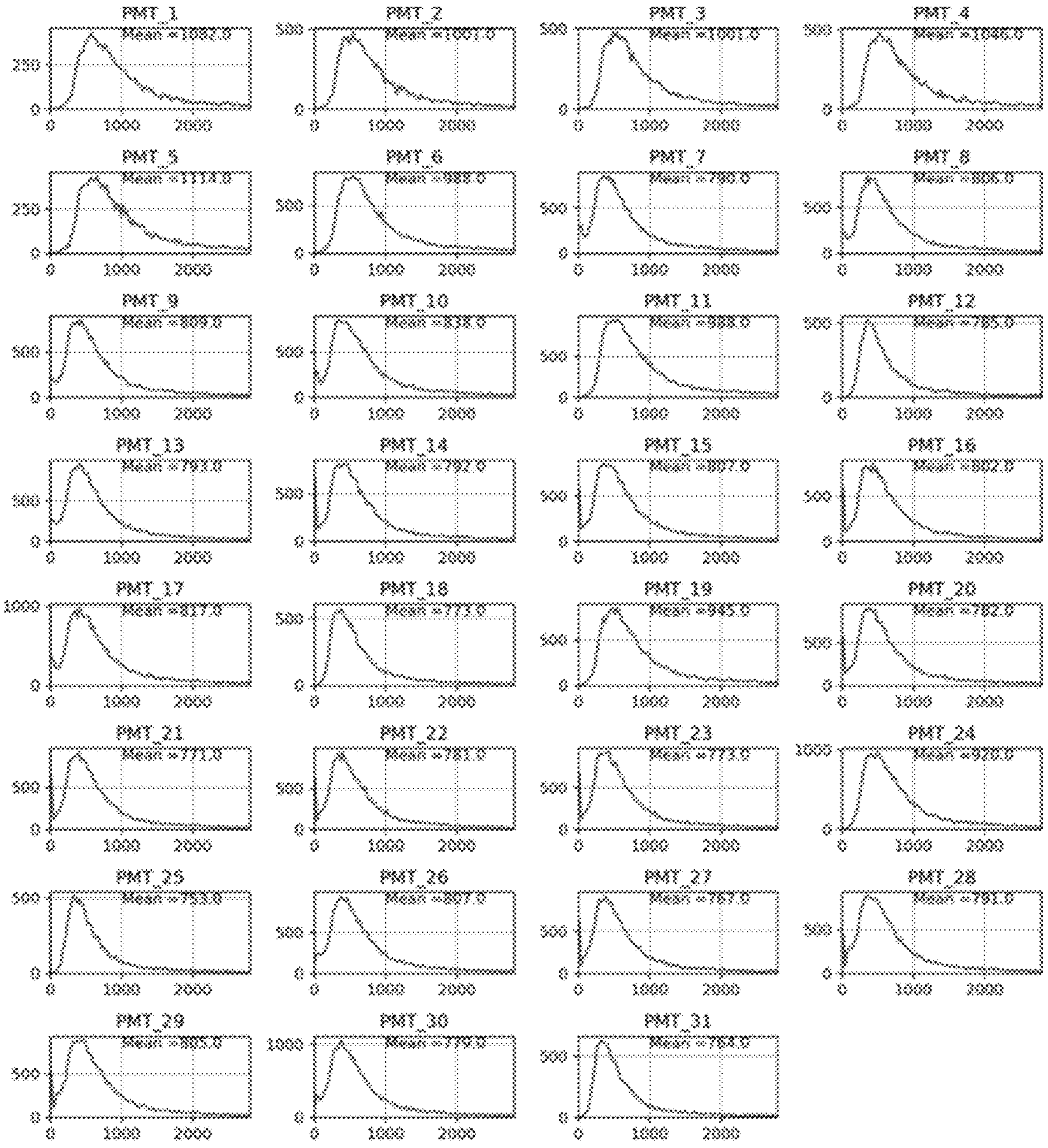
FIG. 5 shows energy spectrums of all photomultiplier tubes according to some embodiments of the present disclosure.

In some embodiments, after obtaining the detection data by filtering for each photomultiplier tube, the corresponding energy spectrum is determined based on the photoelectric signals in the detection data for each photomultiplier tube. The energy spectrum includes energy values for multiple photoelectric signals, which are obtained by the photomultiplier tube based on the emitted photons corresponding to different interaction positions. FIG. 5 shows an example of energy spectrums of 31 photomultiplier tubes.

In step S500, a relative gain of each of the photomultiplier tubes is calibrated based on the corresponding energy spectrum.

Specifically, when there is a large amount of sets of background data, the numbers of photons actually received by photomultiplier tubes at different positions should match expected numbers of received photons. Therefore, in the expected case, the energy spectrums of different photomultiplier tubes should be consistent. Therefore, based on an energy spectrum obtained from actual detection, the relative gain of the corresponding photomultiplier tube can be calibrated, so that energy spectrums of the different photomultiplier tubes after calibration become more consistent, improving the uniformity of the gamma detector's detection.

In the above method for calibrating a photoelectric conversion module, the plurality of sets of background data are obtained to determine the interaction positions of the scintillation crystal with the cosmic rays. Then, based on the positions of the photomultiplier tubes, the corresponding target regions are determined. The background data corresponding to the interaction positions that fall within the target region of each of the photomultiplier tubes is taken as detection data for the corresponding photomultiplier tube. Finally, the energy spectrum is determined based on the detection data, and the relative gain of the corresponding photomultiplier tube is calibrated based on the energy spectrum, completing the calibration of the photoelectric conversion module. The method does not require the use of an additional gamma ray source to irradiate the photoelectric conversion module, making the calibration process simpler and avoiding the radiation risks associated with the ray source.

In some embodiments, in step S200, determining interaction positions based on the plurality of sets of background data, respectively, includes calculating an energy center of gravity of all the photoelectric signals of each set of background data by a center of gravity method and taking the energy center of gravity as the interaction position.

In some embodiments, in one set of background data, each photomultiplier tube corresponds to one photoelectric signal. Therefore, the position of the photoelectric signal corresponds one-to-one with the position of the photomultiplier tube. Based on the signal values of all photoelectric signals in the set of background data and the positions corresponding to the photoelectric signals, the energy center of gravity can be calculated by a center of gravity method, and the obtained energy center of gravity is taken as the interaction position.

Figure 3:
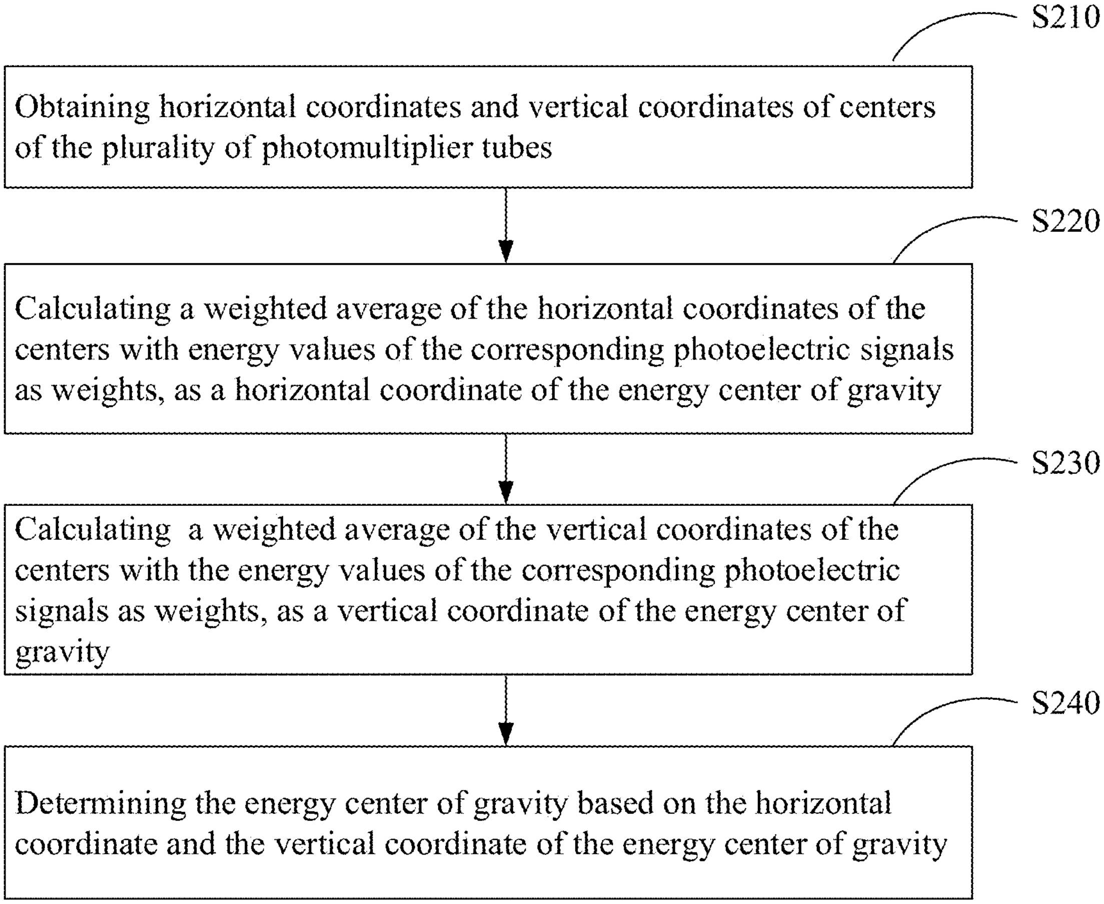
FIG. 3 is a schematic flowchart of determining an energy center of gravity according to some embodiments of the present disclosure.

In some embodiments, as shown in FIG. 3, the calculation of the energy center of gravity of all the photomultiplier signals by the center of gravity method includes the following steps S210-S240.

In step S210, horizontal coordinates and vertical coordinates of centers of the plurality of photomultiplier tubes are obtained.

In step S220, a weighted average of the horizontal coordinates of the centers with energy values of the corresponding photoelectric signals as weights is calculated, as a horizontal coordinate of the energy center of gravity.

In step S230, a weighted average of the vertical coordinates of the centers with the energy values of the corresponding photoelectric signals as weights is calculated, as a vertical coordinate of the energy center of gravity.

In step S240, the energy center of gravity is determined based on the horizontal coordinate and the vertical coordinate of the energy center of gravity.

Specifically, calculation of one interaction position is explained for example. First, obtain central horizontal and vertical coordinates of all the photomultiplier tubes from one set of background data, denoted as $(x_i, y_i)$, where i represents the i-th photomultiplier tube, and a signal energy of the photoelectric signal of the corresponding photomultiplier is denoted as $E_i$. At this point, the horizontal coordinate of the energy center of gravity X and the vertical coordinate of the energy center of gravity Y are calculated using the following formulas:

$$X = \frac{\sum_i E_i x_i}{\sum_i E_i},\ Y = \frac{\sum_i E_i y_i}{\sum_i E_i}.$$

Correspondingly, the energy center of gravity (X, Y), i.e., the interaction position, is determined based on the weighted average of the horizontal coordinates of the centers of the photomultiplier tubes and the weighted average of the vertical coordinates of the centers of the photomultiplier tubes, using the signal energies of the photoelectric signals of the photomultiplier tubes as the weights. By performing the above calculation for each set of background data, the corresponding interaction positions are obtained, which are the positions where the scintillation crystal interacts with the cosmic rays respectively.

In other embodiments of the present disclosure, the calculation of the energy center of gravity of all the photoelectric signals of each set of background data by the center of gravity method includes selecting photomultiplier tubes with the corresponding photoelectric signals greater than a threshold value, obtaining horizontal coordinates and vertical coordinates of centers of the selected photomultiplier tubes, calculating a weighted average of the horizontal coordinates of the centers with energy values of the corresponding photoelectric signals as weights, as a horizontal coordinate of the energy center of gravity, calculating a weighted average of the vertical coordinates of the centers with the energy values of the corresponding photoelectric signals as weights, as a vertical coordinate of the energy center of gravity, and determining the energy center of gravity based on the horizontal coordinate and the vertical coordinate of the energy center of gravity.

As such, by setting a threshold to select the photomultiplier tubes' photoelectric signals for the calculation of the energy center of gravity, the computation load is reduced, and computational efficiency is improved. In some embodiments, the threshold can be, for example, 5% of the total energy of all the photomultiplier tubes.

In some embodiments, in step S300, the determination of the target regions of the photomultiplier tubes based on the positions of the photomultiplier tubes, respectively, includes determining a region within a distance of less than a preset value from a center of each of the photomultiplier tubes as the target region of the corresponding photomultiplier tube.

Figure 4:
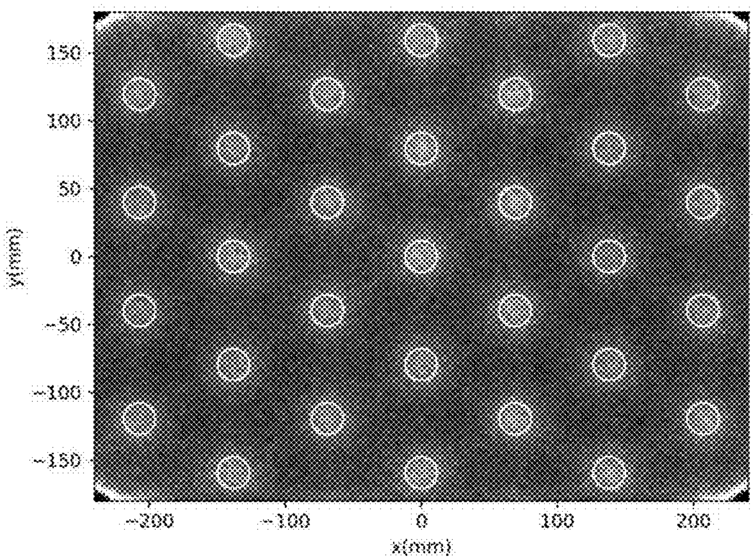
FIG. 4 is a schematic diagram showing target regions of photomultiplier tubes according to some embodiments of the present disclosure.

In the embodiments, the target region is set to be within a distance of less than a preset value from the center of the photomultiplier tube, which is a circular region with the center of the photomultiplier tube as the center of the circle and a radius equal to the preset value. The preset value can be set according to the detection area of the photomultiplier tube. Exemplarily, the preset value is set to 1 cm. FIG. 4 shows the setting of target regions in some embodiments. Multiple interaction positions with different brightness exist on the plane, representing different energy levels. The number of photomultiplier tubes is 31, and accordingly, there are 31 corresponding target regions. The target region is set to be within a distance of less than 1 cm from the center of the photomultiplier tube, which is represented by the circle in the figure. In some other embodiments, the target region can also be set as a rectangle or other shapes.

In some embodiments, the target region can be defined by pixels. For example, the target region can be determined by specifying a certain number of pixels from the center of the photomultiplier tube. Exemplarily, for a 3-inch photomultiplier tube with a cross-section size of 76.2 mm, if each pixel in the image is 0.1 mm, the radius of the target area can be set to be less than 38.1 mm, i.e., 381 pixels, such as i.e., a range with a radius of 100 pixels.

In some other embodiments, the target area can be defined as an edge region of the entire detection range of the photomultiplier tube. The edge region refers to an area that is offset from the center of the photomultiplier tube. For example, the edge region can be circular, rectangular, etc., with its center offset from the center of the photomultiplier tube by a certain distance.

Figure 6:
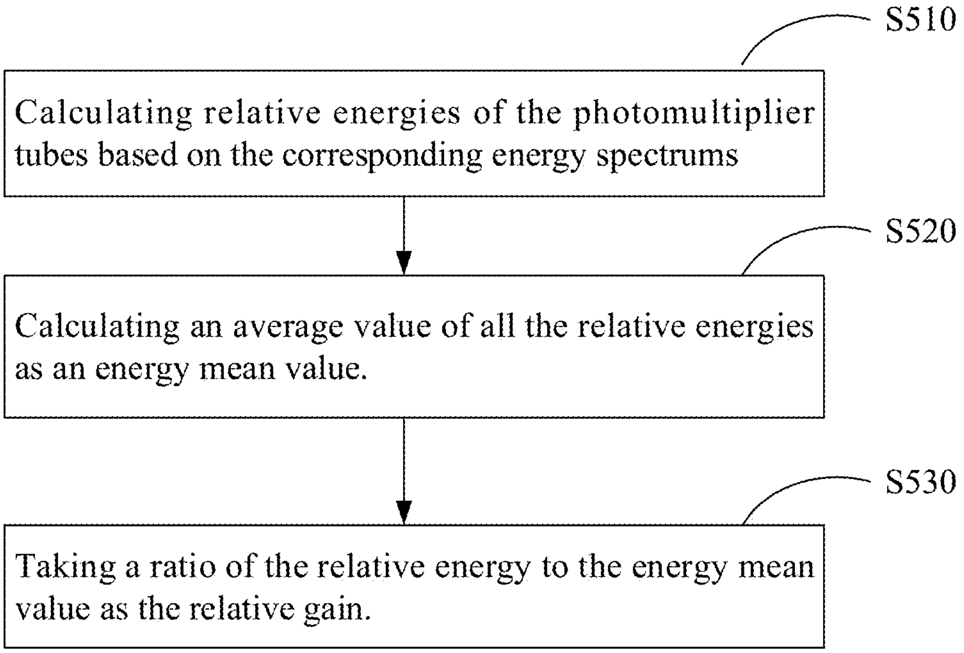
FIG. 6 is a schematic flowchart of determining a relative gain of a photomultiplier tube according to some embodiments of the present disclosure.

In some embodiments, as shown in FIG. 6, in step S500, the calibration of the relative gain of each of the photomultiplier tubes based on the corresponding energy spectrum includes the following steps S510-S530.

In step S510, relative energies of the photomultiplier tubes are calculated based on the corresponding energy spectrums.

Specifically, the detection data corresponding to the photomultiplier tube includes photoelectric signals detected corresponding to different interaction positions. Based on the energy values of these photoelectric signals in the detection data, the energy spectrum corresponding to the photomultiplier tube can be determined. Once the energy spectrum is determined, the relative energy of the corresponding photomultiplier tube is calculated. The relative energy represents the overall energy of all the photoelectric signals generated by the photomultiplier tube and is used to compare with other photomultiplier tubes. In some embodiments, the energy value that occurs most frequently in the energy spectrum is selected as the relative energy. In this case, the relative energy is the mode of all the energy values in the spectrum. In another embodiment, the average of all the energy values in the energy spectrum can be calculated and used as the relative energy. In this case, the relative energy is the mean of all the energy values. In some other embodiments, the sum of all the energy values in the energy spectrum can also be calculated and used as the relative energy. By performing similar calculations on the multiple energy spectrums, the relative energies of all the photomultiplier tubes can be obtained.

Figure 7:
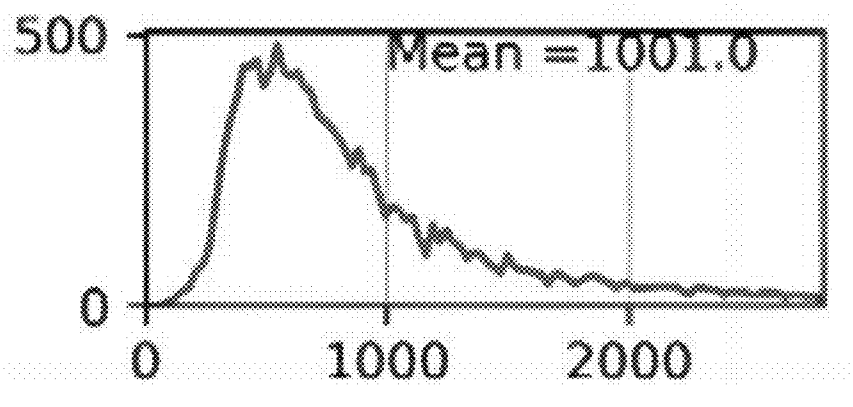
FIG. 7 shows an energy spectrum of a photomultiplier tube according to some embodiments of the present disclosure.

FIG. 7 shows an exemplary energy spectrum of a photomultiplier tube, in which the horizontal axis represents the energy value of the photoelectric signals, and the vertical axis represents the quantity of photoelectric signals, indicating the number of times the photoelectric signal of a particular energy value was detected. Based on the data in the energy spectrum, the corresponding relative energy can be calculated. In FIG. 7, the average of all the energy values calculated based on the data of energy spectrum is 1001.0. When the average value is used as the relative energy, the relative energy is therefore 1001.0.

In step S520, an average value of all the relative energies is calculated as an energy mean value.

In step S530, a ratio of the relative energy to the energy mean value is taken as the relative gain.

Specifically, after calculating the relative energies for all the photomultiplier tubes, the average of all the relative energies is calculated as the energy mean value. A ratio of the relative energy of the photomultiplier tube to the energy mean value is taken as the relative gain of the photomultiplier tube. The relative gain is calculated by the following formula:

$$G_i = \frac{A_i}{\sum_i A_i/n}$$

where $G_i$ is the relative gain of the i-th photomultiplier tube, $A_i$ is the relative energy of the i-th photomultiplier tube, and n is the total number of photomultiplier tubes. Through the above steps, the relative gain corresponding to each photomultiplier tube can be calculated, thereby completing the calibration of the photoelectric conversion module.

In some embodiments of the present disclosure, the method can be used in medical imaging devices such as PET (Positron Emission Tomography) and SPECT (Single Photon Emission Computed Tomography). These medical imaging devices use gamma detectors to detect gamma rays and reconstruct three-dimensional images based on collected signals. For example, in the present disclosure, the method further includes correcting energy values generated by the photomultiplier tubes based on the corresponding relative gains, and reconstruing an image based on the corrected energy values of the photomultiplier tubes. For example, the energy values are multiplied by the corresponding relative gains to obtain the corrected energy values. Therefore, the performance of the gamma detector and the quality of the reconstructed image can be improved.

It should be understood that although the steps in the flowchart of the embodiments described above are shown in sequence as indicated by the arrows, these steps are not necessarily executed in the order indicated by the arrows. Unless explicitly stated in this document, there is no strict sequential limitation on the execution of these steps, and they can be performed in other orders. Moreover, at least some of the steps in the flowchart of the embodiments described above may include multiple sub-steps or stages, which do not necessarily need to be completed at the same time. These steps or stages can be executed at different times, and the order of their execution does not have to be sequential. Instead, they can be performed alternately or in parallel with other steps or sub-steps in other steps or stages.

Based on the same inventive concept, the embodiments of the present disclosure also provide an apparatus for implementing the method for calibrating a photoelectric conversion module described above. The solution provided by the apparatus to solve the problem is similar to the solution described in the method above. Therefore, the specific definitions in one or more embodiments of the apparatus for calibrating a photoelectric conversion module can be referred to in the previous description of the method for calibrating a photoelectric conversion module and will not be repeated here.

Figure 8:
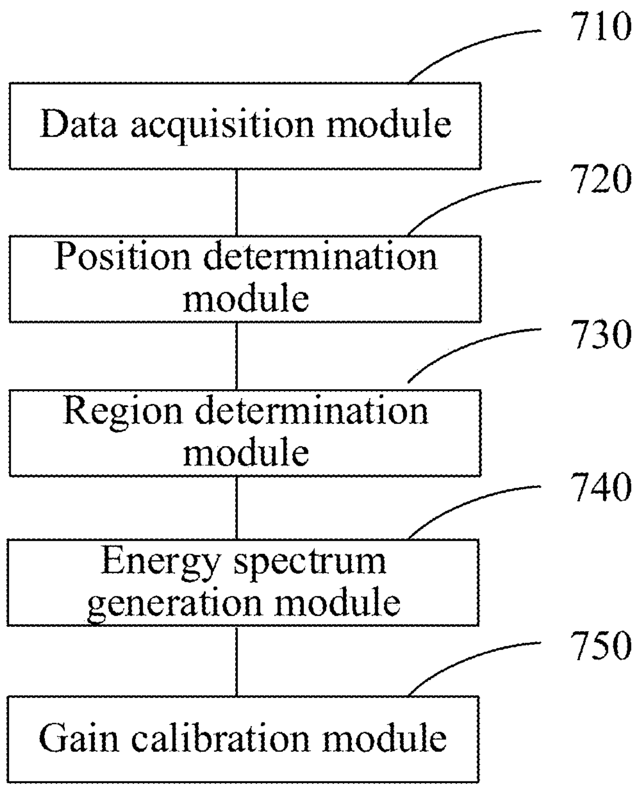
FIG. 8 is a schematic block diagram of an apparatus for calibrating a photoelectric conversion module according to some embodiments of the present disclosure.

In some embodiments, as shown in FIG. 8, an apparatus for calibrating a photoelectric conversion module is provided, including a data acquisition module 710, a position determination module 720, a region determination module 730, an energy spectrum generation module 740, and a gain calibration module 750.

The data acquisition module 710 is configured to acquire a plurality of sets of background data. Each set of background data includes photoelectric signals generated by the plurality of photomultiplier tubes based on an interaction of the scintillation crystal with a cosmic ray.

The position determination module 720 is configured to determine interaction positions based on the plurality of sets of background data, respectively. The interaction positionings are positions where the scintillation crystal interacts with the cosmic rays respectively.

The region determination module 730 is configured to determine target regions of the photomultiplier tubes based on positions of the photomultiplier tubes, respectively.

The energy spectrum generation module 740 is configured to obtain an energy spectrum of each of the photomultiplier tubes based on the background data corresponding to the interaction positions that fall within the target region of each of the photomultiplier tubes as detection data for the corresponding photomultiplier tube.

The gain calibration module 750 is configured to calibrate a relative gain of each of the photomultiplier tubes based on the corresponding energy spectrum.

In some embodiments, the position determination module 720 is also configured to calculate an energy center of gravity of all the photoelectric signals based on a center of gravity method, and take the energy center of gravity as the interaction position.

In some embodiments, the position determination module 720 is further configured to obtain horizontal coordinates and vertical coordinates of centers of the plurality of photomultiplier tubes, calculate a weighted average of the horizontal coordinates of the centers with energy values of the corresponding photoelectric signals as weights, as a horizontal coordinate of the energy center of gravity, calculate a weighted average of the vertical coordinates of the centers with the energy values of the corresponding photoelectric signals as weights, as a vertical coordinate of the energy center of gravity, and determine the energy center of gravity based on the horizontal coordinate and the vertical coordinate of the energy center of gravity.

In some embodiments, the region determination module 730 is also configured to determine a region within a distance of less than a preset value from each of the photomultiplier tubes as the target region of the corresponding photomultiplier tube.

In some embodiments, the gain calibration module 750 is also configured to calculate relative energies of the photomultiplier tubes based on the energy spectrums, respectively, calculate an average of all the relative energies as an energy mean value, and take a ratio of one of the relative energies to the energy mean value as the relative gain of the corresponding photomultiplier tube.

In some embodiments, the gain calibration module 750 is further configured to select a mode of energy values in the energy spectrum as the relative energy of the corresponding photomultiplier tube.

In some embodiments, the gain calibration module 750 is also configured to calculate an average of all energy values in the energy spectrum as the relative energy of the corresponding photomultiplier tube.

The various modules in the above apparatus for calibrating a photoelectric conversion module can be implemented wholly or partially through software, hardware, or a combination of both. These modules can be embedded in or independent from the processor in the computer device in hardware form, or they can be stored in the memory of the computer device in software form, allowing the processor to perform the corresponding operations of each module.

Figure 9:
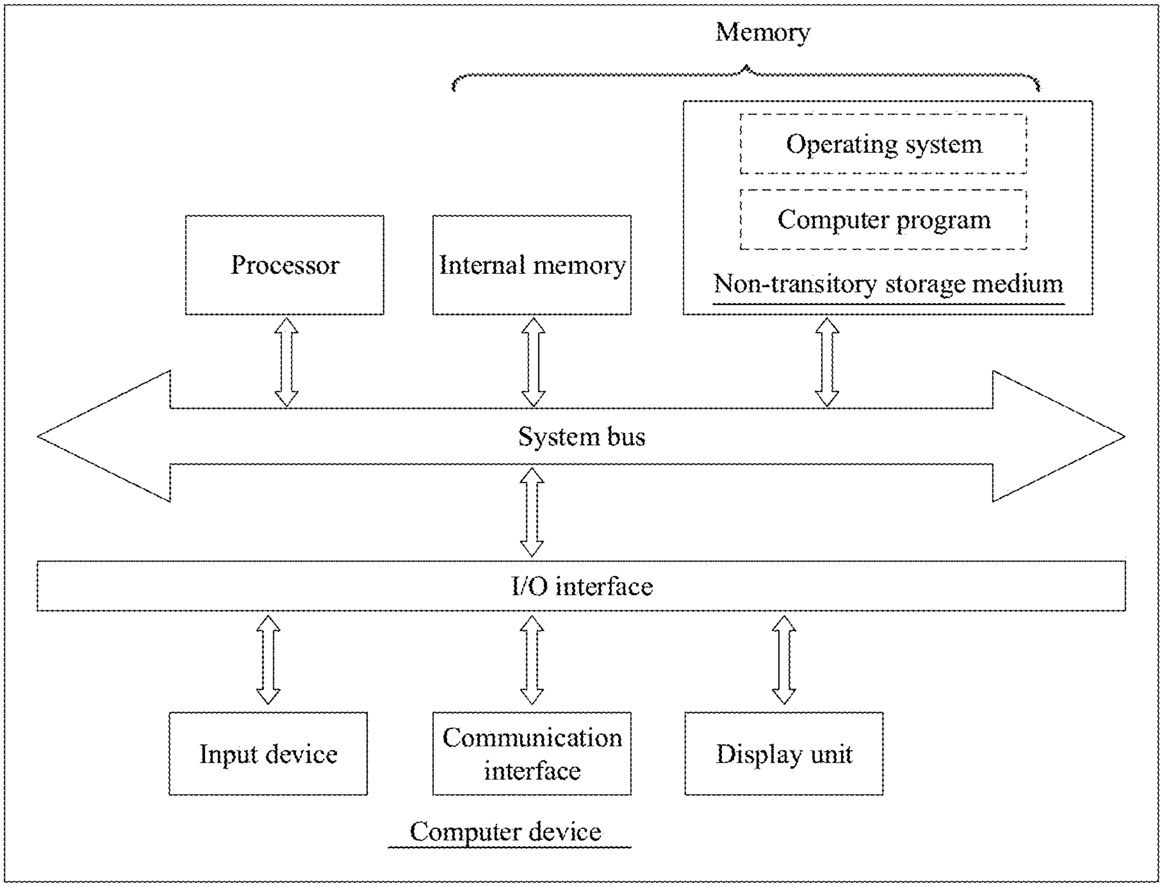
FIG. 9 is a diagram showing an internal structure of a computer device according to some embodiments of the present disclosure.

In some embodiments, a computer device is provided, which may be a terminal, the internal structure of which is shown in FIG. 9. The computer device includes a processor, a memory, an I/O interface, a communication interface, a display unit, and an input device. The processor, memory, and I/O interface are connected through a system bus, while the communication interface, display unit, and input device are connected to the system bus via the I/O interface. The processor of the computer device is used to provide computing and control capabilities. The memory of the computer device includes a non-transitory storage medium and internal memory. The non-transitory storage medium stores the operating system and computer programs. The internal memory provides an environment for the operation of the operating system and computer programs stored in the non-transitory storage medium. The I/O interface of the computer device is used for exchanging information between the processor and external devices. The communication interface of the computer device is used to communicate with external terminals via wired or wireless methods, where wireless communication can be achieved using technologies such as Wi-Fi, mobile cellular networks, NFC (Near Field Communication), or others. The computer program, when executed by the processor, causes the processor to perform a method for calibrating a photoelectric conversion module according to any one of the embodiments as described above. The display unit of the computer device is used to form visually visible images and can be a display screen, projection device, or virtual reality imaging device. The display screen can be a liquid crystal display (LCD) or an electronic ink display. The input device of the computer device can be a touch layer overlaid on the display screen, buttons, trackballs, or touchpads on the computer device's casing, or external devices such as a keyboard, touchpad, or mouse.

Those skilled in the art will understand that the structure shown in FIG. 9 is merely a block diagram of a portion of the structure relevant to the solution of the present disclosure, and does not constitute a limitation on the computer device to which the solution of the present disclosure is applied. The specific computer device may include more or fewer components than those shown in the figure, combine certain components, or have a different component arrangement.

In some embodiments, a computer device is provided, which includes a memory and a processor. The memory stores a computer program. The processor, when executing the computer program, performs the method for calibrating a photoelectric conversion module described in the various embodiments above.

In some other embodiments, a computer-readable storage medium is provided, such as a non-transitory computer-readable storage medium, on which a computer program is stored. The computer program, when executed by a processor, causes the processor to perform the method for calibrating a photoelectric conversion module described in the various embodiments above.

Those skilled in the art will understand that the entire or partial processes of the methods in the above embodiments can be executed by instructing the relevant hardware through a computer program. The computer program can be stored in a non-transitory computer-readable storage medium, and when executed, it can include the processes as described in the various embodiments of the methods above. In the embodiments provided in the present disclosure, any references to memory, databases, or other medium may include at least one of non-transitory and volatile memory types. Non-transitory memory may include Read-Only Memory (ROM), tapes, floppy disks, flash memory, optical storage, high-density embedded non-transitory memory, resistive random access memory (ReRAM), magnetoresistive random access memory (MRAM), ferroelectric random access memory (FRAM), phase-change memory (PCM), graphene memory, and so on. Volatile memory may include Random Access Memory (RAM) or external high-speed cache memory. For illustration, and not limitation, RAM can take various forms such as Static Random Access Memory (SRAM) or Dynamic Random Access Memory (DRAM), among others. The databases referred to in the embodiments provided in the present disclosure may include at least one of relational and non-relational databases. Non-relational databases may include, for example, distributed databases based on blockchain technology, but are not limited to this. The processors referred to in the embodiments provided in the present disclosure may be general processors, central processing units (CPUs), graphics processing units (GPUs), digital signal processors (DSPs), programmable logic devices, quantum computing-based data processing units, and so on, without limitation.

The technical features of the above embodiments can be combined in any way. For the sake of brevity, not all possible combinations of the technical features in the above embodiments are described. However, as long as these combinations do not contradict each other, they should be considered within the scope disclosed in this specification.

The embodiments described above represent only a few of the possible implementations of the present disclosure. These descriptions are relatively specific and detailed, but should not be construed as limiting the scope of the patent application. It should be noted that, for those skilled in the art, without departing from the inventive concept of the present disclosure, various modifications and improvements can be made, all of which are within the protection scope of the present disclosure. Therefore, the scope of protection of the present disclosure should be determined by the appended claims.

What is claimed is:

1. A method for calibrating a photoelectric conversion module of a gamma detector, the gamma detector comprising a scintillation crystal and a plurality of photomultiplier tubes, the method comprising:

acquiring a plurality of sets of background data, each set of the background data comprising photoelectric signals generated by the plurality of photomultiplier tubes based on an interaction of the scintillation crystal with a cosmic ray;

determining interaction positions based on the plurality of sets of background data, respectively, the interaction positionings being positions where the scintillation crystal interacts with cosmic rays respectively;

determining target regions of the photomultiplier tubes based on positions of the photomultiplier tubes, respectively;

obtaining an energy spectrum of each of the photomultiplier tubes based on the background data corresponding to the interaction positions that fall within the target region of each of the photomultiplier tubes; and calibrating a relative gain of each of the photomultiplier tubes based on the corresponding energy spectrum.

2. The method according to claim 1, wherein determining the interaction positions based on the plurality of sets of background data, respectively, comprises:

calculating an energy center of gravity of all the photoelectric signals of each set of background data by a center of gravity method and taking the energy center of gravity as the interaction position.

3. The method according to claim 2, wherein calculating the energy center of gravity of all the photoelectric signals of each set of background data by the center of gravity method comprises:

obtaining horizontal coordinates and vertical coordinates of centers of the plurality of photomultiplier tubes;

calculating a weighted average of the horizontal coordinates of the centers with energy values of the corresponding photoelectric signals as weights, as a horizontal coordinate of the energy center of gravity;

calculating a weighted average of the vertical coordinates of the centers with the energy values of the corresponding photoelectric signals as weights, as a vertical coordinate of the energy center of gravity; and determining the energy center of gravity based on the horizontal coordinate and the vertical coordinate of the energy center of gravity.

4. The method according to claim 2, wherein calculating the energy center of gravity of all the photoelectric signals of each set of background data by the center of gravity method comprises:

selecting photomultiplier tubes with the corresponding photoelectric signals greater than a threshold value;

obtaining horizontal coordinates and vertical coordinates of centers of the selected photomultiplier tubes;

calculating a weighted average of the horizontal coordinates of the centers with energy values of the corresponding photoelectric signals as weights, as a horizontal coordinate of the energy center of gravity;

calculating a weighted average of the vertical coordinates of the centers with the energy values of the corresponding photoelectric signals as weights, as a vertical coordinate of the energy center of gravity; and determining the energy center of gravity based on the horizontal coordinate and the vertical coordinate of the energy center of gravity.

5. The method according to claim 1, wherein determining the target regions of the photomultiplier tubes based on the positions of the photomultiplier tubes, respectively, comprises:

determining a region within a distance of less than a preset value from a center of each of the photomultiplier tubes as the target region of the corresponding photomultiplier tube.

6. The method according to claim 1, wherein calibrating the relative gain of each of the photomultiplier tubes based on the corresponding energy spectrum comprises:

calculating relative energies of the photomultiplier tubes based on the energy spectrums, respectively;

calculating an average of all the relative energies as an energy mean value; and taking a ratio of one of the relative energies to the energy mean value as the relative gain of the corresponding photomultiplier tube.

7. The method according to claim 6, wherein calculating the relative energies of the photomultiplier tubes based on the energy spectrums, respectively, comprises:

selecting a mode of energy values in the energy spectrum as the relative energy of the corresponding photomultiplier tube.

8. The method according to claim 6, wherein calculating the relative energies of the photomultiplier tubes based on the energy spectrums, respectively, comprises:

calculating an average of all energy values in the energy spectrum as the relative energy of the corresponding photomultiplier tube.

9. The method according to claim 1, further comprising:

correcting an energy value of a photoelectric signal generated by the photomultiplier tube during a medical imaging process based on the corresponding relative gain, and obtaining a corrected energy value.

10. A non-transitory computer-readable storage medium storing a computer program, wherein the computer program, when executed by a processor, causes the processor to perform a method for calibrating a photoelectric conversion module according to claim 1.

11. An apparatus for calibrating a photoelectric conversion module of a gamma detector, the gamma detector comprising a scintillation crystal and a plurality of photomultiplier tubes, the apparatus comprising:

a data acquisition module, configured to acquire a plurality of sets of background data, each set of the background data comprising photoelectric signals generated by the plurality of photomultiplier tubes based on an interaction of the scintillation crystal with a cosmic ray;

a position determination module, configured to determine interaction positions based on the plurality of sets of background data, respectively, the interaction positionings being positions where the scintillation crystal interacts with cosmic rays respectively;

a region determination module, configured to determine target regions of the photomultiplier tubes based on positions of the photomultiplier tubes, respectively;

an energy spectrum generation module, configured to obtain an energy spectrum of each of the photomultiplier tubes based on the background data corresponding to the interaction positions that fall within the target region of each of the photomultiplier tubes; and a gain calibration module, configured to calibrate a relative gain of each of the photomultiplier tubes based on the corresponding energy spectrum.

12. A computer device, comprising a memory and a processor, the memory storing a computer program, wherein the processor when executing the computer program, performs a method for calibrating a photoelectric conversion module of a gamma detector, the gamma detector comprising a scintillation crystal and a plurality of photomultiplier tubes, the method comprising:

acquiring a plurality of sets of background data, each set of the background data comprising photoelectric signals generated by the plurality of photomultiplier tubes based on an interaction of the scintillation crystal with a cosmic ray;

determining interaction positions based on the plurality of sets of background data, respectively, the interaction positionings being positions where the scintillation crystal interacts with the cosmic rays respectively;

determining target regions of the photomultiplier tubes based on positions of the photomultiplier tubes, respectively;

obtaining an energy spectrum of each of the photomultiplier tubes based on the background data corresponding to the interaction positions that fall within the target region of each of the photomultiplier tubes; and calibrating a relative gain of each of the photomultiplier tubes based on the corresponding energy spectrum.

13. The computer device according to claim 12, wherein determining the interaction positions based on the plurality of sets of background data, respectively, comprises:

calculating an energy center of gravity of all the photoelectric signals of each set of background data by a center of gravity method and taking the energy center of gravity as the interaction position.

14. The computer device according to claim 13, wherein calculating the energy center of gravity of all the photoelectric signals of each set of background data by the center of gravity method comprises:

obtaining horizontal coordinates and vertical coordinates of centers of the plurality of photomultiplier tubes;

calculating a weighted average of the horizontal coordinates of the centers with energy values of the corresponding photoelectric signals as weights, as a horizontal coordinate of the energy center of gravity;

calculating a weighted average of the vertical coordinates of the centers with the energy values of the corresponding photoelectric signals as weights, as a vertical coordinate of the energy center of gravity; and determining the energy center of gravity based on the horizontal coordinate and the vertical coordinate of the energy center of gravity.

15. The computer device according to claim 13, wherein calculating the energy center of gravity of all the photoelectric signals of each set of background data by the center of gravity method comprises:

selecting photomultiplier tubes with the corresponding photoelectric signals greater than a threshold value;

obtaining horizontal coordinates and vertical coordinates of centers of the selected photomultiplier tubes;

calculating a weighted average of the horizontal coordinates of the centers with energy values of the corresponding photoelectric signals as weights, as a horizontal coordinate of the energy center of gravity;

calculating a weighted average of the vertical coordinates of the centers with the energy values of the corresponding photoelectric signals as weights, as a vertical coordinate of the energy center of gravity; and determining the energy center of gravity based on the horizontal coordinate and the vertical coordinate of the energy center of gravity.

16. The computer device according to claim 12, wherein determining the target regions of the photomultiplier tubes based on the positions of the photomultiplier tubes, respectively, comprises:

determining a region within a distance of less than a preset value from a center of each of the photomultiplier tubes as the target region of the corresponding photomultiplier tube.

17. The computer device according to claim 12, wherein calibrating the relative gain of each of the photomultiplier tubes based on the corresponding energy spectrum comprises:

calculating relative energies of the photomultiplier tubes based on the energy spectrums, respectively;

calculating an average of all the relative energies as an energy mean value; and taking a ratio of one of the relative energies to the energy mean value as the relative gain of the corresponding photomultiplier tube.

18. The computer device according to claim 17, wherein calculating the relative energies of the photomultiplier tubes based on the energy spectrums, respectively, comprises:

selecting a mode of energy values in the energy spectrum as the relative energy of the corresponding photomultiplier tube.

19. The computer device according to claim 17, wherein calculating the relative energies of the photomultiplier tubes based on the energy spectrums, respectively, comprises:

calculating an average of all energy values in the energy spectrum as the relative energy of the corresponding photomultiplier tube.

20. The computer device according to claim 17, further comprising:

correcting an energy value of a photoelectric signal generated by the photomultiplier tube during a medical imaging process based on the corresponding relative gain, and obtaining a corrected energy value.

* * * * *